Oct. 15, 1929.  W. E. NOBBE  1,731,260
METHOD FOR PRODUCING SHEET GLASS
Filed Feb. 15, 1928
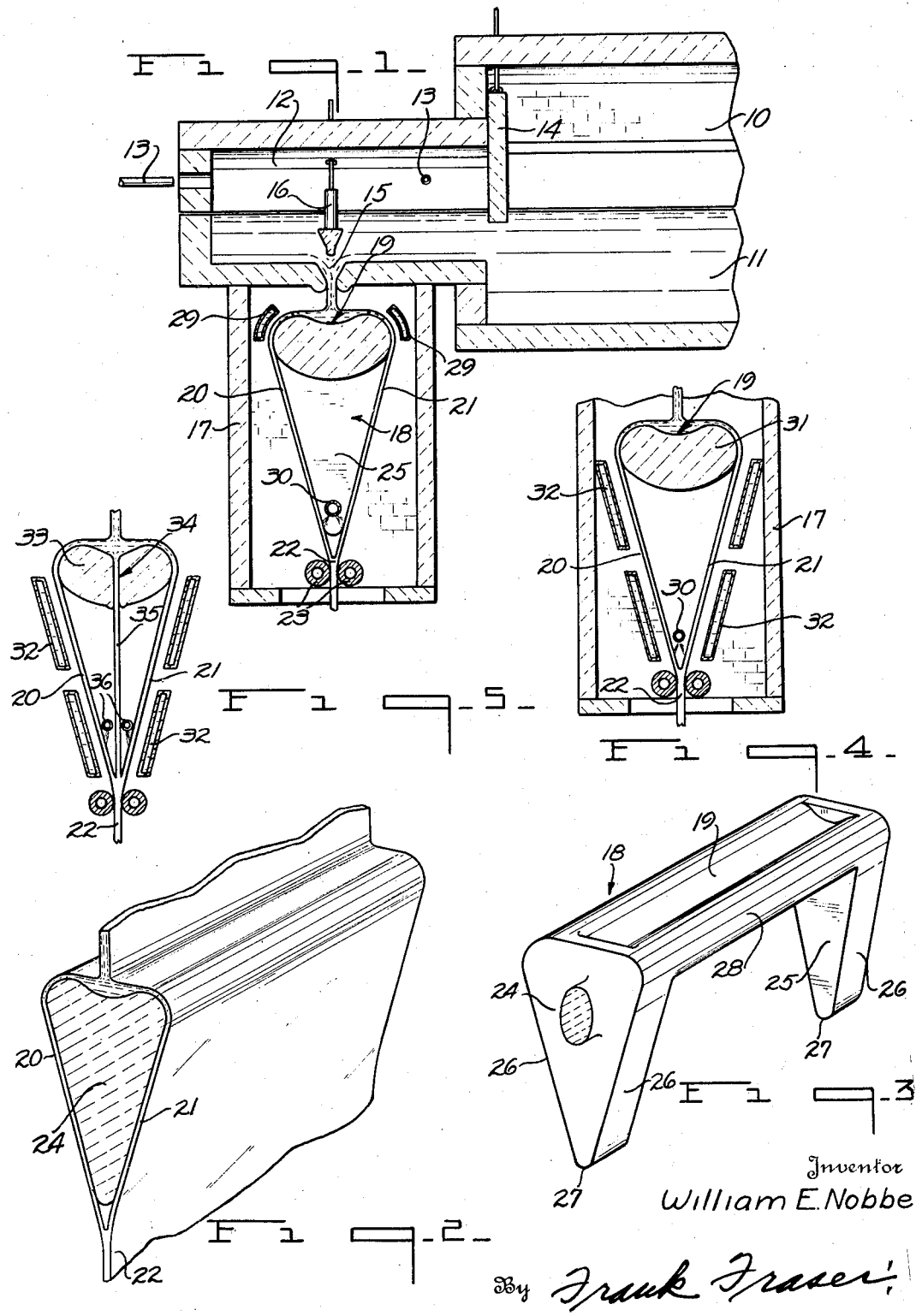
Inventor
William E. Nobbe
By Frank Fraser
Attorney Patented Oct. 15, 1929

1,731,260

UNITED STATES PATENT OFFICE

WILLIAM E. NOBBE, OF TOLEDO, OHIO, ASSIGNOR TO THE LIBBEY-OWENS GLASS COMPANY, OF TOLEDO, OHIO, A CORPORATION OF OHIO

METHOD FOR PRODUCING SHEET GLASS

Application filed February 15, 1928. Serial No. 254,329.

This invention relates broadly to the manufacture of glassware and more especially to the production of glass in continuous or substantially continuous flat sheet form.

An important object of the present invention is the provision of an improved method of and apparatus for simplifying, rendering more efficient and improving generally the flow of glass downwardly in sheet form from a bath of molten glass.

Another object of the invention is the provision of an improved method and apparatus for forming sheet glass whereby a plurality of streams of molten glass are adapted to be flowed downwardly from a molten source in spaced relation, the body portions of said streams being free from contact with mechanical means during the major portion of their travel and the said streams being subsequently united to form a single sheet.

Another object is to provide such an improved method and apparatus of the herein described character wherein preferably two streams of molten glass are flowed downwardly from a molten bath in spaced relation over stationary directing surfaces, the streams being maintained in spaced relation as they leave said surfaces and their body portions free from contact with any mechanical means during the remainder of their travel, the said streams being subsequently united to form a single sheet.

A further object is to provide such an improved method and apparatus of the herein described character wherein a source of molten glass flowed upon the upper end of a directing member overflows the opposite sides thereof in the form of two separate streams, said streams being flowed downwardly in spaced converging relation and subsequently united to form a single sheet, the directing member being so constructed that the edge portions only of the streams contact therewith during the major portion of their travel.

Still another object is the provision of an improved type of directing member or slab for use in the production of sheet glass and especially wherein glass is flowed downwardly from a molten bath.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical section through improved sheet glass forming apparatus constructed in accordance with the present invention.

Fig. 2 is a perspective sectional view showing the manner in which the glass flows over and down the opposite sides of the directing member or slab.

Fig. 3 is a perspective view of the improved type of directing member or slab, and Figs. 4 and 5 are sectional views showing modified forms of the present invention.

In the well known process for forming sheet glass wherein the glass is flowed downwardly from a molten bath in a plurality of streams or films over and in contact with the opposite surfaces of a stationary slab or directing member, one of the objectional features thereof is that the streams of glass are very apt to be marred or injured due to their intimate contact with the slab surfaces. In other words, the refractory surfaces of the slab have a natural tendency to wear away under the action of the molten glass and the clay particles carried along with the streams of glass are formed into the sheet causing defects therein. Also, the worn portions of the slab surfaces cause lines, etc., to appear in the finished product whereby the quality of the sheet produced is not as high as it would otherwise be were these objectional features eliminated. These objectional features are largely avoided by the present invention and this is accomplished by the provision of a novel and improved form of directing member or slab which will now be described more in detail reference being had to the accompanying drawings.

In the drawings, having special reference first to Figs. 1, 2 and 3, the numeral 10 indicates fragmentarily the exit end of a suitable furnace within which is adapted to be produced the mass of molten glass 11. This furnace may or may not be of the continuous tank type as preferred but if such a furnace is used, the molten glass 11 will be produced in the melting end thereof, not here shown but being to the right of Fig. 1. The molten glass will then flow slowly through the refining end of the furnace into the flowing or working chamber 12. The glass within chamber 12 may be maintained at the desired working or flowing temperature by means of burners 13 and the flow of glass thereinto may be accurately controlled upon vertical adjustment of the gate or shear cake 14.

The bottom wall of the flowing chamber 12 is preferably provided with an elongated slot or outlet orifice 15 through which the molten glass is adapted to flow. A gate or plug member 16 is here shown as being suspended within the molten glass above slot 15 and this member may be raised or lowered by any suitable means to regulate the flow of molten glass from chamber 12 downwardly through the slot 15 therein.

Arranged beneath the flowing chamber 12 is a compartment 17 within which is disposed a vertically positioned slab or directing member designated in its entirety by the numeral 18 suitably supported beneath the slot 15 in any desired manner. A recess or receptacle 19 is formed in the top of member or slab 18 and this recess first receives the stream of molten glass which flows downwardly through the slot 15.

The molten glass within receptacle 19 is adapted to overflow in equal quantities over the opposite sides of the directing member in relatively thin streams or films indicated at 20 and 21. These streams then flow downwardly in spaced converging relation and are adapted to be united at the lower end of the directing member to form a single sheet 22. This sheet may then be passed between a pair of rolls 23 which rolls may be so arranged as to reduce the combined streams or films to a sheet of substantially predetermined thickness or if desired, the rolls 23, may function simply as guiding and converging rolls for the downwardly moving sheet 22.

The accomplishment of the hereinabove stated objects and the advantages sought to be obtained thereby is made possible by the novel construction and arrangement of directing member 18. As shown particularly in Fig. 3 this directing member is of relatively small cross section throughout the major portion of its length but is provided at its opposite ends with the relatively large depending end portions 24 and 25. Otherwise stated, the body portion of the directing member 18 is substantially kidney-shaped in cross section as shown in Fig. 1 and is provided at its opposite ends with depending substantially wedge-shaped portions 24 and 25 having opposite flat downwardly converging faces 26 which meet at the lower edge 27 of such directing member. Thus, the directing member is of substantially inverted U-shape.

When placed in operative position within the compartment 17 the central body portion of the directing member will be in line with the central portion of slot 15 and the end portions in line with the ends thereof. Thus, the edge portions of the streams will flow downwardly over and in contact with the wedge-shaped end portions 24 and 25 of the directing member while the body portions of the streams will be free from contact therewith during the major portion of their downward travel. The edge portions of the streams will contact with the end portions of the directing member throughout their entire downward travel while the contact between the central or body portions of the streams and said member will be of short duration. In fact, the body portions of said streams contact with the body portion of the directing member only as they flow over the relatively narrow faces 28 and for the remainder of their travel are out of contact therewith.

The frictional resistance offered to the edge portions of the streams due to their contact with the end portions of the directing member together with the drawing action exerted on the streams by the rolls 23 will serve to maintain the streams under sufficient tension to prevent them from buckling, bending, etc. Moreover, arcuately curved heat absorbing members 29 may be positioned opposite the faces 28 to cool the body portions of said streams as they flow thereover. The faces 28 are sufficiently wide and the contact of the molten glass therewith sufficiently long to allow the glass to assume stream form as it flows thereover and the heat absorbing members are provided in order to cool the body portions of the streams so that they will be sufficiently viscous to maintain their form after they pass out of contact with said surfaces. Burners 30 may be utilized if found necessary to assist in the welding of the two streams together.

It is believed that by constructing the slab or directing member in the above manner whereby contact of the body portions of the streams therewith will be reduced to a minimum, a sheet of much higher quality and relatively free from common glass defects can be produced.

In Fig. 4 is shown a somewhat modified type of apparatus. The slab or directing member is designated by the numeral 31 and as here shown the end portions 24 and 25 are eliminated and the slab is substantially kidney-shaped in cross section throughout its entire length. As the streams of glass 20 and 21 flow downwardly out of contact with the opposite surfaces of slab 31 they are maintained spaced from one another and free from contact with any mechanical means or directing surface during the remainder of their downward travel, the streams being subsequently united to form the single sheet 22. One or a plurality of heat absorbing members 32 may be provided adjacent the streams 20 and 21 to cause a substantial setting thereof whereby they will be prevented from buckling, bending, etc.

In Fig. 5 the directing member or slab is designated 33 and this slab is of substantially the same form as slab 31 in Fig. 4 with the single exception that it is further provided with a vertical slot 34 extending therethrough at approximately the transverse center thereof. Thus in addition to the streams 20 and 21 overflowing the opposite sides of the directing member, a third stream of molten glass 35 will flow downwardly through slot 34 and will be subsequently united with streams 20 and 21 to form the single sheet 22. Heat absorbing members 32 may also be provided for causing a setting of the streams 20 and 21 while burners 36 may be employed to assist in the welding of the three streams together if found necessary. In this form of the invention as in Fig. 4, the several streams are continued downwardly in spaced relation after they leave the directing member and are maintained free from contact with any mechanical means or directing surfaces until they are united.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of forming sheet glass, which consists in creating two downwardly flowing streams of molten glass, maintaining the body portions of said streams free from contact with mechanical means during the major portion of their travel, uniting said streams and continuing movement thereof in the form of a single sheet.

2. The method of forming sheet glass, which consists in flowing two streams of molten glass downwardly in spaced relation and the body portions thereof free from contact with mechanical means during the major portion of their travel, subsequenly uniting the streams, and then continuing movement thereof in the form of a single sheet.

3. The method of forming sheet glass, which consists in flowing two streams of molten glass downwardly in spaced relation over directing surfaces, maintaining said streams in spaced relation after they leave said surfaces and the body portions thereof free from contact with any mechanical means, and subsequently uniting the streams to form a single sheet.

4. The method of forming sheet glass, which consists in creating two downwardly flowing streams of molten glass, maintaining said streams free from contact with mechanical means except at their edges only during the major portion of their travel, and in subsequently uniting the streams to form a single sheet.

5. The method of forming sheet glass, which consists in flowing two streams of molten glass downwardly from a molten source in spaced relation over directing surfaces, maintaining the streams spaced from one another and free from contact with any directing surfaces except at their edges, and then uniting the streams to form a single sheet.

6. The method of forming sheet glass, which consists in establishing a supply of molten glass in a container, overflowing the glass from the container and allowing it to flow in a plurality of streams over directing surfaces, continuing movement of the streams free from contact with any mechanical means, and subsequently uniting the streams to form a single sheet.

7. The method of forming sheet glass, which consists in flowing a plurality of streams of molten glass downwardly in spaced relation over directing surfaces, maintaining said streams in spaced relation after passing out of contact with said surfaces and continuing downward movement thereof free from contact with mechanical means, and subsequently uniting said streams to form a single sheet.

8. The method of forming sheet glass, which consists in flowing a plurality of streams of molten glass downwardly in spaced converging relation and free from contact with any mechanical means or directing surfaces, subsequently uniting the streams and continuing movement thereof in the form of a single sheet.

Signed at Toledo, in the county of Lucas and State of Ohio, this 10th day of February, 1928.

WILLIAM E. NOBBE.